Nov. 25, 1941.   R. N. DOBSON   2,263,800
AIRCRAFT LANDING GEAR
Filed March 15, 1940   4 Sheets-Sheet 1

INVENTOR
R. N. DOBSON
BY *Fetherstonhaugh & Co.*
ATTORNEYS

Nov. 25, 1941.   R. N. DOBSON   2,263,800
AIRCRAFT LANDING GEAR
Filed March 15, 1940   4 Sheets-Sheet 4

INVENTOR
R. N. DOBSON

Patented Nov. 25, 1941

2,263,800

UNITED STATES PATENT OFFICE 2,263,800

AIRCRAFT LANDING GEAR

Richard N. Dobson, Fort William, Ontario, Canada

Application March 15, 1940, Serial No. 324,169

10 Claims. (Cl. 244—108)

This invention relates to aircraft equipped with skis; and it comprises improved means for locking the skis at a predetermined angle in relation to the body or understructure of the aircraft when the latter is in flight.

According to this invention the skis are moved to and locked in a predetermined flight position by the extension of suitable hydraulic jacks. The strokes of the jacks and their location are such that, when the jacks are fully extended, they exert a restraining force on the skis which is sufficient to prevent rotation of the skis about their axles by the opposing aero-dynamic and acceleration forces acting on the skis when the aircraft is in flight. The extension and retraction of the jacks is under the control of the pilot so that, when a landing is to be made, the jacks may be fully retracted to remove the restraining force holding the skis against rotation about their axles. The skis are thus freed to assume the proper landing angle when brought in contact with the ground. The ski-controlling jacks are connected in hydraulic circuit with a main directional control valve and a source of fluid under pressure. The main control valve is located within the cockpit within convenient reach of the pilot. The hydraulic circuit also includes emergency relief valves which open to by-pass oil around the jack pistons in case a landing is made with the skis in their locked position. The opening of the emergency relief valves relieves the fluid pressure holding the jacks in their extended positions and thus relieves the restraining pressure on the skis sufficiently to permit a safe landing to be made. Suitable indicators are also provided to indicate the position of the jack pistons and to warn the pilot in case a landing or take-off is attempted with the skis in their locked positions.

Proceeding now to a more detailed description of this invention reference will be had to the accompanying drawings, wherein—

Figure 1:
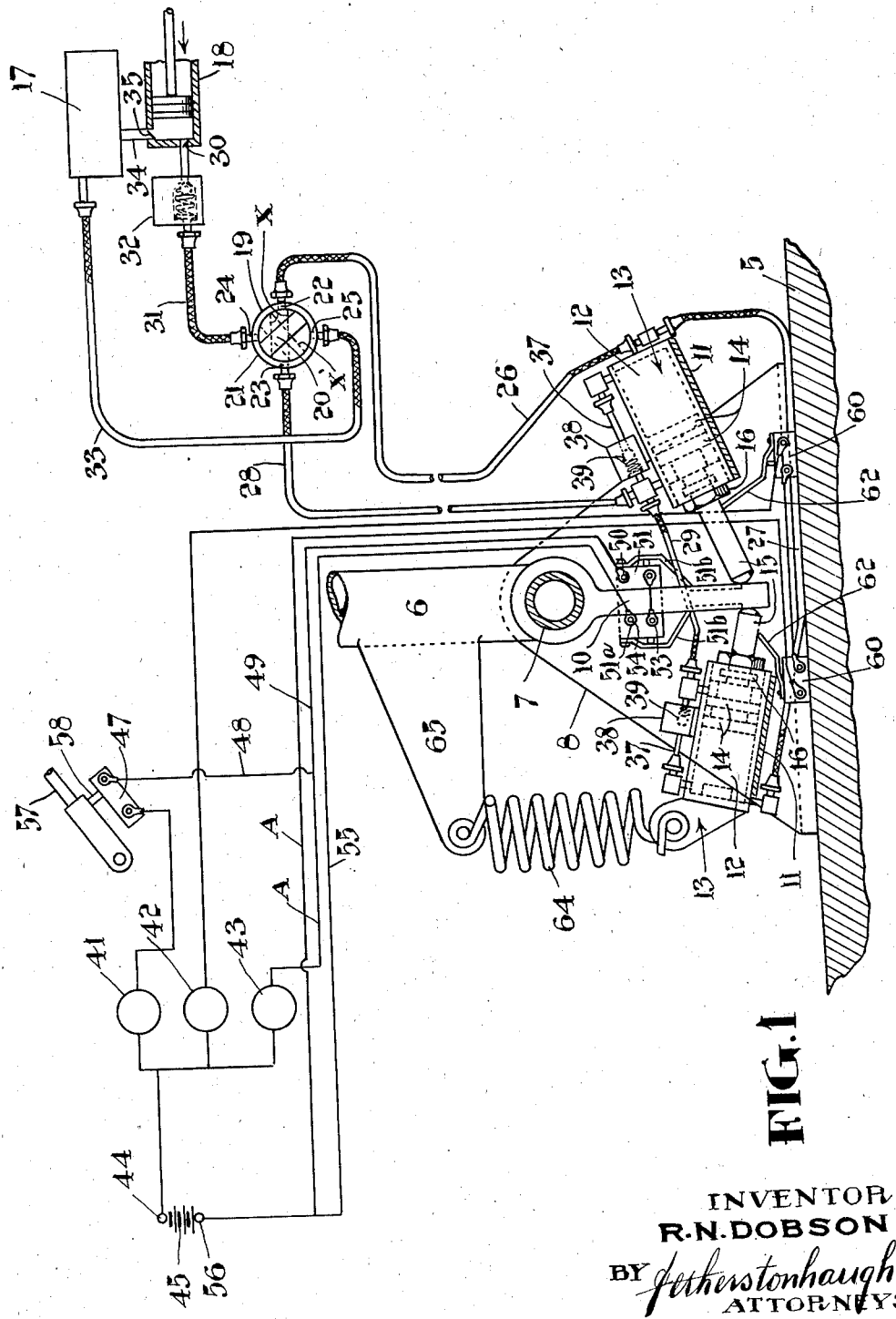
Fig. 1 is a view, in side elevation, of the ski-controlling jacks provided in accordance with this invention. In this view the hydraulic control circuit and the indicators are shown diagrammatically.

In the construction shown in Fig. 1, 5 designates the base of a conventional ski and 6 designates the piston tube of a conventional shock strut. These parts are pivotally connected by means of the ski axle 7 which passes through the lower portion of the strut 6 and through the upper portions of a pair of side plates 8 fixed to the ski base 5. The strut 6 is also provided with a rigidly connected lever arm 10 which projects below the axle 7. A plate 11 extends between and is welded to the side plates 8 at each side of the axle 7. These plates 11 carry the cylinders 12 of the hydraulic jacks generally indicated at 13. The jack pistons 14 are equipped with piston rods 15 which extend outwardly through stuffing boxes 16 provided at the inner ends of the cylinders 12. When the jacks are extended by movement of the pistons to the position shown in Fig. 1, the free ends of the pistons 14 are forced against opposite sides of the lever arm 10 and serve to prevent relative rotation of the ski base 5 and the strut 6 about the axle 7. When the jacks are retracted by forcing the pistons 14 to the outer ends of the cylinders 12, the piston rods 15 are withdrawn from engagement with the lever arm 10 and the ski base 5 is free to move about the axle 7 relative to the strut 6.

The hydraulic jacks 13 are shown connected in hydraulic circuit with a pressure fluid reservoir 17, a pump 18, and a main directional control valve 19. In the present instance valve 19 is shown diagrammatically as comprising a movable valve member 20 and a valve casing 21, the latter being provided with ports 22, 23, 24 and 25. Port 22 is connected to the outer ends of the jack cylinders 12 by fluid lines 26 and 27. Port 23 is connected to the inner ends of cylinders 12 by fluid lines 28 and 29. Port 24 is connected to the outlet 30 of pump 18 by a fluid line 31 equipped with a check valve 32. Port 25 is connected by fluid line 33 to the reservoir 17 which, in turn, is connected by fluid line 34 to the pump inlet 35. When it is desired to extend the hydraulic jacks 13 to their ski locking positions the movable valve member 20 of the main control valve 19 is positioned as shown by full lines in Fig. 1. The pump 18 is then operated either by hand or motive power to withdraw fluid from the reservoir 17 and to force such fluid through the check valve 32, line 31, valve ports 24 and 22, and lines 26 and 27 to the outer ends of cylinders 12, thus forcing the jack pistons 14 inwardly to engage the piston rods 15 with opposite sides of the lever arm 10. At the same time fluid previously supplied to the inner ends of the cylinders 12 is forced back to the reservoir 17 through lines 29 and 28, valve ports 23 and 25, and line 33. The movable valve member 20 is then turned to the dotted line position X so that it blocks off the port 23 and thus closes line 26 to trap the pressure fluid in the outer ends of the cylinders 12.

When it is desired to free the ski of the restraining force applied by the hydraulic jacks 13 the valve member 20 of valve 19 is moved to the dotted line position X' and the pump 18 is operated to force fluid through check valve 32, line 31, valve ports 24 and 23, and lines 28 and 29 to the inner ends of cylinders 12, thus forcing pistons 14 to the outer ends of said cylinders and withdrawing the piston rods 15 from engagement with the lever arm 10. At the same time the fluid previously supplied to the outer ends of the cylinders is exhausted to the reservoir 17 through lines 27, 26, valve ports 22 and 25 and line 33. The outer and inner ends of each cylinder 12 are connected by a by-pass connection 37 equipped with a pressure relief valve 38 which opens to permit the by-passing of fluid from the outer to the inner end of the cylinder when the pressure in the outer end of the cylinder exceeds the closing pressure applied to the valve 38 by the valve loading spring 39. The loading of the valve 38 is regulated so that the pressure required to open said valve is in excess of the highest pressure resulting from the aero-dynamic and acceleration forces imposed on the skis when the aircraft is in flight. The purpose of the valves 38 is to permit oil to be by-passed from the outer to the inner ends of the cylinders 12 so as to relieve the restraining pressure on the skis sufficiently to prevent accidents when a landing is inadvertently attempted with the skis in their locked position.

Suitable indicators are preferably provided to indicate the position of the jack pistons and to warn the pilot in case a landing or take-off is attempted with the skis in their locked position. In the present instance I have shown three indicating lamps connected in circuit with switches controlled by the operation of the hydraulic jacks. The lamp 41 serves as a warning lamp which is lighted whenever a landing or take-off is attempted with the skis in the locked position. The lamp 42 is energized when the skis are in their unlocked position while the lamp 43 is energized when the skis are in their locked position. As here shown each of the lamps 41, 42 and 43 has one terminal connected to one side 44 of a battery or other source of current 45. The remaining terminal of lamp 41 is connected by conductor 46, throttle operated switch 47 and conductors 48 and 49 to terminal 50 of a jack controlled switch 51 having its remaining terminal 52 connected to terminal 53 of a companion jack control switch 51a. The remaining terminal 54 of switch 51a is connected by line 55 to the remaining terminal 56 of the current supply source 45. The remaining terminal of lamp 43 is also connected by conductor 49 to the previously mentioned switch terminal 50. The switches 51 and 51a are micro switches of the type manufactured by the Micro Switch Corporation, of Freeport, Ill. and, so far as the specific construction thereof is concerned, form no part of the present invention. For present purposes it is deemed sufficient to say that the switches are provided with switch operating arms 51b which are engaged and operated to their switch closing positions by the piston rods 15 when jacks 13 are in their fully extended position. When switches 51 and 51a are thus closed lamp 43 is energized to indicate that the skis are in their locked position. When the aircraft is travelling at normal speed the throttle control lever 57 is disengaged with the operating plunger 58 of switch 47 and the latter is in its open-circuit position so that lamp 41 is deenergized. When, however, the throttle lever 57 is operated to slow down the aircraft for landing purposes it is brought into engagement with the plunger 58 to close switch 47. The lamp 41 is then energized to serve as a warning signal drawing attention of the pilot to the fact that, as indicated by lamp 43, the skis are in their locked position. If the pilot fails to heed this warning and makes a landing with the skis still in their locked position the increased pressure developed in the outer ends of the cylinder 12 when the skis contact the ground is relieved through the by-pass connections 37 so that a safe landing is assured. In the present instance I have shown switches 51 and 51a carried by the lever arm 10 with the switch operating arms 51b extending downwardly along opposite sides of said lever arm in position to be engaged and forced to a switch closing position by the jack pistons 14 when the jacks are extended. When the jacks 13 are retracted to free the skis for landing purposes the switches 51 and 51a are opened by outward movement of the switch operating arms 51b and the lamps 41 and 43 are deenergized.

The lamp 42, which is energized when the skis are in their unlocked position, is connected across the current source 45 in series with two jack operated switches 60 similar to the switches 51 and 51a. The switches 60 are equipped with conventional switch operating arms 62 arranged to be engaged and moved to switch opening positions by the piston rods 15 when the jacks 13 are fully extended. When the jacks 13 are retracted the piston rods 15 are withdrawn to a position clear of the switch operating arms 62 and permit the latter to move to a switch closing position, thus energizing the lamp 42 to indicate that the jacks are in their unlocked positions.

A spring 64 is connected between one of the jack cylinders 12 and an arm 65 projecting laterally from the strut 6. This spring serves to hold up the nose of the ski during landing and take off operations when piston rods 15 are retracted.

Figure 2:
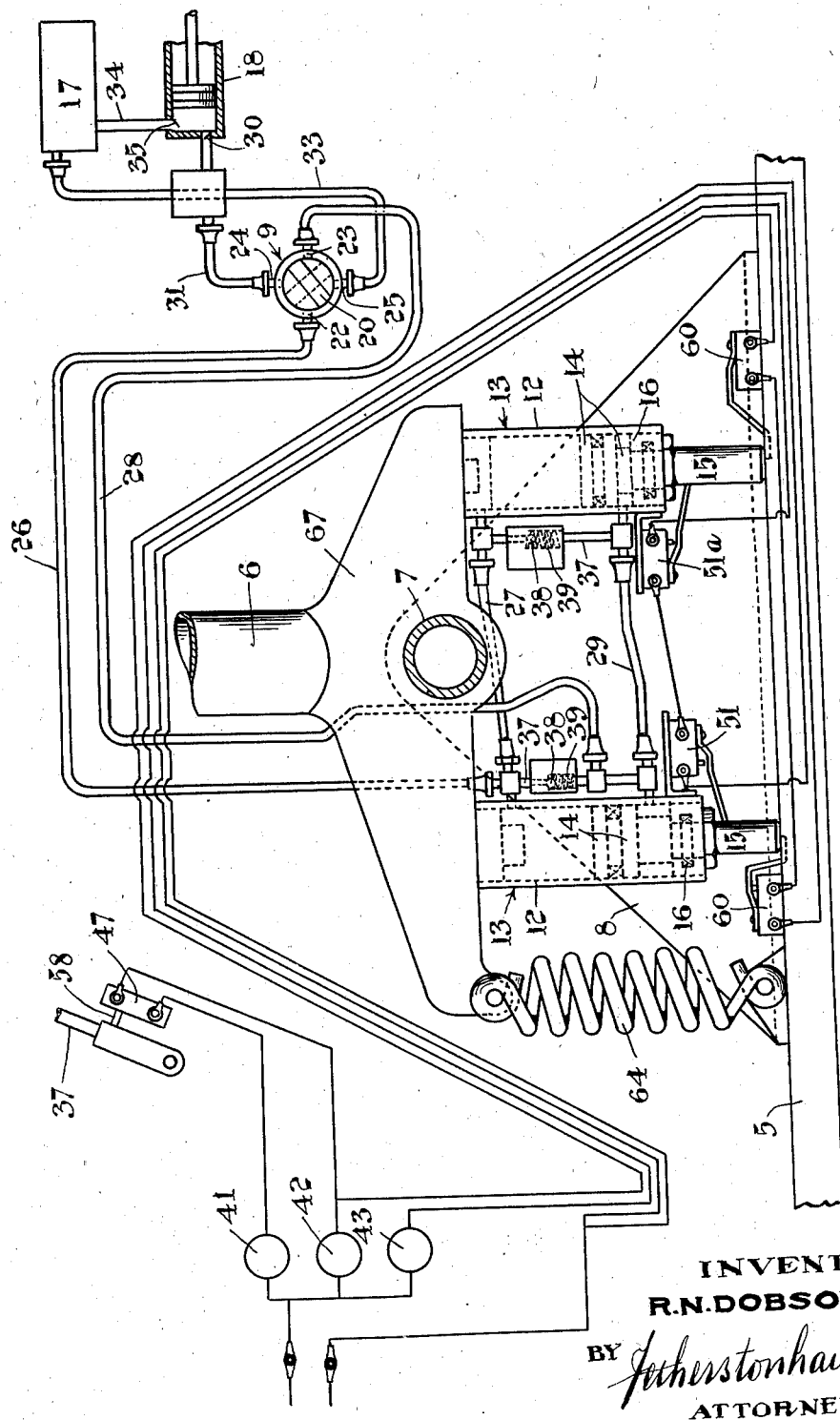
Fig. 2 is a view similar to Fig. 1, but showing a slight modification.

In the modified construction shown in Fig. 2, the jack cylinders 12 are arranged vertically with their upper ends rigidly attached to the ends of a lever 67 which is rigid with the struts 6 and projects upwardly beyond opposite sides of the axle 7. In this case the piston rods 15 bear directly on the ski base 5 at opposite sides of the axle 7 to hold the ski and strut against relative movement about said axle when the jacks are fully extended.

The hydraulic and electrical circuits shown in Fig. 2 are substantially the same as the corresponding circuits described in connection with Fig. 1.

Figure 3:
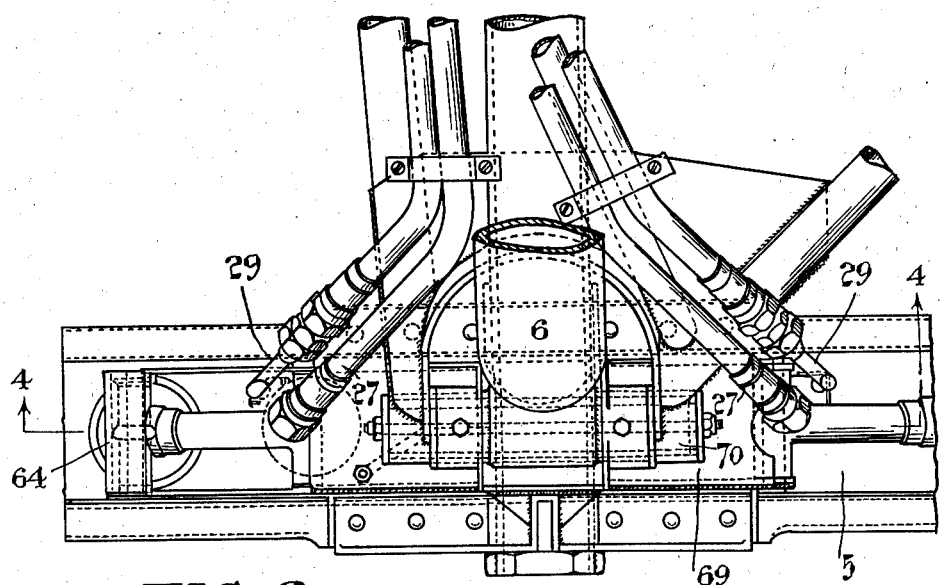
Fig. 3 is a fragmentary plan view showing a further modification.
Figure 4:
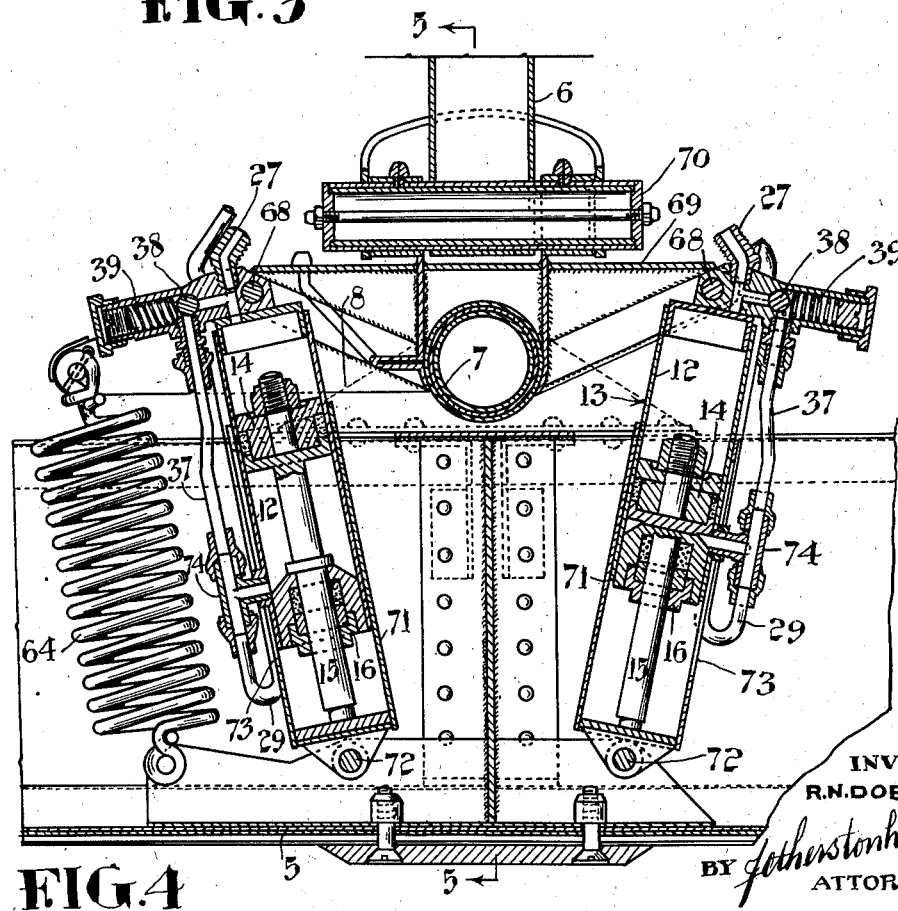
Fig. 4 is a sectional view taken substantially along the line 4—4 of Fig. 3.
Figure 5:
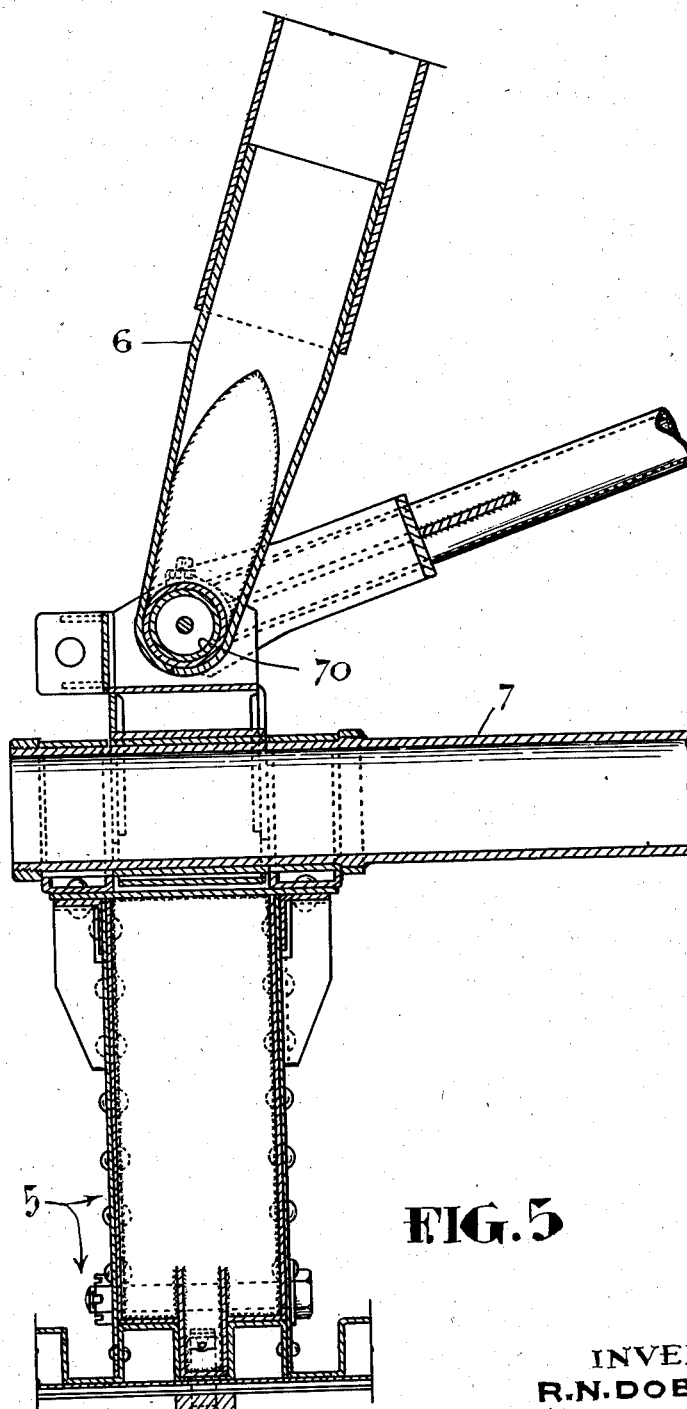
Fig. 5 is a sectional view taken substantially along the line 5—5 of Fig. 4. In this view certain parts that would otherwise appear have been omitted for the sake of clearness.

In Figs. 3 to 5 inclusive, I have shown a further modification in which the cylinders 12 have their upper ends pivoted, at 68, to the extremities of a lever arm 69 which projects beyond opposite sides of the axle 7, said lever arm being fastened to the strut 6 by a pivotal connection 70, the longitudinal axis of which is at right angles to the longitudinal axis of the axle 7. In this case the piston rods 15 bear against the lower end walls of suitable guide tubes 71 which are slidably fitted on the cylinders 12, the lower ends of said tubes being pivotally attached, at 72, to the ski base 5. The guide tubes 71 are slotted as indicated at 73 to accommodate the T-connection 74 joining the fluid lines 29 and the by-pass connections 37.

Having thus fully described what I now consider to be the preferred embodiment of this invention it will be understood that various modifications may be resorted to within the scope and spirit of the appended claims. It is also to be understood that the term "body element" appearing in the appended claims is used in a generic sense and is intended to cover any part of the body or under structure of the aircraft to which the skis are pivotally attached.

Having thus described my invention, what I claim is:

1. Aircraft landing gear comprising a body element, a ski element, means pivotally connecting said elements, and hydraulic jacks arranged between said elements at opposite sides of the pivotal connection and adapted, when extended, to unyieldingly resist movement of said ski about said pivotal connection by the aero-dynamic and acceleration forces imposed on the ski when the aircraft is in flight.

2. Aircraft landing gear comprising a body element, a ski element, means pivotally connecting said elements, a lever rigid with the body element and extending downwardly below said pivotal connection, and hydraulic jacks carried by the ski element and arranged at opposite sides of said lever and said pivotal connection, said jacks being adapted when extended to exert pressure against opposite sides of said lever and to unyieldingly resist rotation of the ski about said pivotal connection by the aero-dynamic and acceleration forces imposed on the ski when the aircraft is in flight.

3. Landing gear for aircraft comprising a body element, a ski element positioned below and pivotally connected to said body element, a lever rigid with said body element and projecting beyond opposite sides of said pivotal connection, and jacks arranged between the ends of said lever and said ski so that, when said jacks are extended, they serve to unyieldingly resist rotation of the ski about said pivotal connection by the aero-dynamic and acceleration forces imposed on the ski when the aircraft is in flight and means for extending and retracting said jacks.

4. Landing gear for aircraft comprising a body element, a ski element positioned below and pivotally connected to said body element, a lever rigid with said body element and projecting beyond opposite sides of the pivotal connection between said body element and said ski element, and a pair of hydraulic jacks arranged between the lever and the ski element at opposite sides of said pivotal connection, each jack comprising a cylinder attached to one end of said lever and a piston working in said cylinder and provided with a piston rod adapted to bear against a part of the ski element when the jack is extended, said jack serving, when extended, to unyieldingly resist rotation of the ski element about said pivotal connection by the aero-dynamic and acceleration forces imposed on the ski when the aircraft is in flight.

5. Landing gear as set forth in claim 4 in which the cylinders of the jacks are pivotally connected to the ends of said lever.

6. Landing gear as set forth in claim 4 in which the cylinders of said jacks are pivotally connected to the ends of said lever and in which the piston rods of said jacks bear against pivotally mounted parts of the ski.

7. Landing gear as set forth in claim 4 in which the cylinders of the jacks are rigidly connected to said lever.

8. Landing gear for aircraft comprising a body element, a ski element, means affording a pivotal connection between said elements, hydraulic jacks arranged at opposite sides of said elements, each jack comprising a cylinder attached to one of said elements, a piston working in said cylinder and provided with a piston rod adapted to press against the other element when the jack is extended, and means for alternately supplying and exhausting fluid from opposite ends of each jack cylinder to control the extension and retraction of the jacks, said jacks serving, when fully extended, to unyieldingly resist rotation of said ski about said pivotal connection by aero-dynamic and acceleration forces imposed on the ski when the aircraft is in flight.

9. Landing gear as set forth in claim 9 in which each jack includes a by-pass connection through which fluid is by-passed from one end of the jack cylinder to the other to permit the jack pistons to be moved in a jack retracting direction by the ski when the aircraft is landed with the jacks in their fully extended ski holding position, each of said by-pass connections including a valve which opens only when the pressure in the jack cylinders tending to hold the jacks in their extended positions exceeds a predetermined value.

10. Aircraft landing gear comprising a body element, a ski element, means affording a pivotal connection between said elements, hydraulic jacks arranged at opposite sides of said pivotal connection so that, when said jacks are fully extended, they serve to resist rotation of the ski element about said pivotal connection by the aero-dynamic and acceleration forces imposed on the ski element when the aircraft is in flight, means for supplying fluid to and alternately exhausting fluid from opposite ends of the jack cylinders to control the extension and retraction of the jacks, and jack operated indicating means associated with said jacks and functioning to indicate whether the jacks are in their extended or retracted condition.

RICHARD N. DOBSON.